United States Patent
Wollmershauser et al.

(10) Patent No.: US 9,578,371 B2
(45) Date of Patent: *Feb. 21, 2017

(54) DIGITAL MULTIMEDIA RECORDER WITH FUNCTIONALITY FOLLOWING LOSS OF PROVIDER NETWORK SERVICE

(71) Applicant: AT&T Intellectual Property I, L.P., Atlanta, GA (US)

(72) Inventors: Steven M. Wollmershauser, San Antonio, TX (US); Jason B. Sprague, San Antonio, TX (US); William O. Sprague, Jr., Wimberley, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,280

(22) Filed: Oct. 28, 2014

(65) Prior Publication Data

US 2015/0052566 A1 Feb. 19, 2015

Related U.S. Application Data

(63) Continuation of application No. 11/848,812, filed on Aug. 31, 2007, now Pat. No. 8,881,203.

(51) Int. Cl.
*H04N 7/173* (2011.01)
*H04N 21/436* (2011.01)
*H04L 12/66* (2006.01)
*H04N 21/64* (2011.01)
*H04N 21/643* (2011.01)

(Continued)

(52) U.S. Cl.
CPC ........ *H04N 21/43615* (2013.01); *H04L 12/66* (2013.01); *H04N 21/436* (2013.01); *H04N 21/64* (2013.01); *H04N 21/64322* (2013.01); *H04N 21/64753* (2013.01); *H04L 63/061* (2013.01); *H04L 63/08* (2013.01)

(58) Field of Classification Search
CPC ............ H04N 21/436; H04N 21/43615; H04N 21/4432; H04N 2007/1739; H04N 2201/0034
See application file for complete search history.

(56) References Cited

U.S. PATENT DOCUMENTS

6,760,538 B1 7/2004 Bumgardner et al.
7,065,778 B1 6/2006 Lu
(Continued)

*Primary Examiner* — Pankaj Kumar
*Assistant Examiner* — Reuben M Brown
(74) *Attorney, Agent, or Firm* — Jackson Walker L.L.P.

(57) ABSTRACT

A network addressable appliance with digital multimedia recording capabilities has limited access including playback of stored multimedia content upon faulty connection with a service provider network. Upon a connectivity event, the network addressable appliance compares a retrieved hardware address for a connected residential gateway to a stored hardware address for an assigned residential gateway. If the two hardware addresses correspond, the network addressable appliance provides playback to stored multimedia content. The system helps prevent violations of digital rights management rules by restricting access to stored multimedia content while the network addressable appliance is connected to an unauthorized residential gateway. The system provides a user with limited access (i.e. playback) to multimedia content during service provider network outages.

12 Claims, 4 Drawing Sheets

(51) Int. Cl.
  *H04N 21/647* (2011.01)
  *H04N 5/445* (2011.01)
  *H04L 29/06* (2006.01)

(56) References Cited

U.S. PATENT DOCUMENTS

| | | |
|---|---|---|
| 7,089,429 B2 | 8/2006 | Gustafsson |
| 7,533,178 B2 | 5/2009 | Henniger |
| 8,683,526 B2 * | 3/2014 | Ruiz-Velasco et al. ........ 725/50 |
| 8,804,704 B1 * | 8/2014 | Petit-Huguenin ....... H04L 12/66 370/352 |
| 8,881,203 B2 * | 11/2014 | Wollmershauser ..... H04L 12/66 713/1 |
| 2002/0194609 A1 | 12/2002 | Tran |
| 2003/0039240 A1 | 2/2003 | Sutanto |
| 2006/0240809 A1 * | 10/2006 | Yu ........................ H04L 63/0428 455/414.1 |
| 2007/0130521 A1 * | 6/2007 | Gonzalez et al. ............ 715/733 |
| 2008/0022298 A1 | 1/2008 | Cavichhia |
| 2009/0016416 A1 | 1/2009 | Fenton et al. |
| 2009/0064266 A1 | 3/2009 | Wollmershauser et al. |
| 2009/0161582 A1 | 6/2009 | Kammer et al. |
| 2010/0005496 A1 | 1/2010 | Ellis et al. |
| 2014/0123167 A1 * | 5/2014 | Wood et al. .................... 725/25 |

\* cited by examiner

DIGITAL MULTIMEDIA RECORDER WITH FUNCTIONALITY FOLLOWING LOSS OF PROVIDER NETWORK SERVICE

The present patent application is a continuation of a previously filed patent application, U.S. patent application Ser. No. 11/848,812, filed Aug. 31, 2007, the entirety of which is hereby incorporated by reference.

BACKGROUND

Field of the Disclosure

The present disclosure relates to accessing recorded multimedia content, and more specifically, to accessing recorded multimedia content stored on a digital multimedia recorder following loss of contact with a service provider network.

Description of the Related Art

Digital multimedia recorders may record multimedia content received from a service provider network. To access the multimedia content, the digital multimedia recorder may require constant communication with the service provider network. Therefore, if connectivity to the service provider network is lost, the digital multimedia recorder may enter a sleep mode or otherwise severely limit access to the multimedia content until the connection to the service provider network is restored.

DESCRIPTION OF THE EMBODIMENT(S)

In a particular embodiment, a set top box includes a processor and a storage resource accessible to the processor. The storage resource includes processor executable instructions to receive broadcasted multimedia content via a wide area network (WAN) connection and store the content in the storage resource. Further instructions determine a WAN connectivity status responsive to a specified event. Responsive to determining an active WAN connectivity status, instructions are operable for transitioning to a first operational state. The first operational state enables delivery of the broadcasted multimedia content stream received via the WAN connection to a display device. Responsive to determining an inactive WAN connectivity status, instructions are operable for transitioning to a second operational state. The second operational state enables delivery of the stored multimedia content to the display device.

In another embodiment, a method is disclosed for controlling access to multimedia content stored on a network addressable digital multimedia recorder. The digital multimedia recorder receives the multimedia content through an assigned residential gateway from a provider network. The method includes storing the multimedia content to a memory, which may be integrated into the digital multimedia recorder. The method further includes storing a first hardware address for the assigned residential gateway to the memory. In response to a connectivity event, the method includes retrieving a second hardware address from a locally connected residential gateway and comparing the stored first hardware address to the retrieved second hardware address. In a particular embodiment, the connectivity event is a loss of connection between the service provider network and the assigned residential gateway. In some embodiments, the connectivity event includes powering up the digital multimedia recorder. If the stored first hardware address corresponds to the retrieved second hardware address, limited access to the multimedia content is provided. The first stored address and the second stored address may be, for example, a media access control address (MAC address), an Ethernet hardware address (EHA), or other hardware address that is intended to be a unique identifier.

In some embodiments, the method includes retrieving a decryption key for decrypting the multimedia content. The multimedia content may include pay-per-view programming, in which the digital multimedia recorder receives an expiration parameter sent from the service provider network. In some embodiments, the digital multimedia recorder receives an Internet Protocol (IP) address from the assigned residential gateway. A method is further disclosed for providing the multimedia content to a set-top box that is in communication with the assigned residential gateway.

In still another embodiment, a network addressable appliance is disclosed that includes a nonvolatile memory for storing multimedia content. The nonvolatile memory stores a first hardware address, which may be a MAC address, corresponding to an assigned residential gateway. The network addressable appliance includes an authentication module for retrieving a second hardware address in response to a connectivity event. The retrieved second hardware address corresponds to a locally connected residential gateway. The authentication module is for comparing the retrieved second hardware address to the stored first hardware address. The network addressable appliance further includes a content playback module for providing access to the multimedia content in response to the retrieved second hardware address corresponding to the stored first hardware address.

As an additional aspect, the network addressable appliance may include a network interface for receiving the multimedia content from a service provider network. The network addressable appliance may also include a controller for encoding the multimedia content, wherein a portion of the encoded multimedia content is for displaying on a client display. In some embodiments, the network addressable appliance further includes a local interface module for sending the multimedia content to a set-top box. The set-top box communicates with an assigned residential gateway. The network addressable appliance may include a decryption module for accessing a decryption key. The decryption key is for decoding the multimedia content. As a further aspect, in some embodiments the network addressable appliance receives an IP address from the assigned residential gateway. In addition, the controller may access an expiration parameter for determining whether the multimedia content has expired.

Other embodiments include a set of processor-executable instructions stored on computer readable medium. The instructions are operable for storing multimedia content in a storage of a set-top box. The instructions are operable for storing a first hardware address, for example a MAC address, of an assigned residential gateway in the storage. A second hardware address of a connected residential gateway is retrieved in response to a connectivity event. Instructions are operable for determining whether the assigned residential gateway is the connected residential gateway and providing access to the stored multimedia content if the assigned residential gateway is the connected residential gateway.

Figure 1:
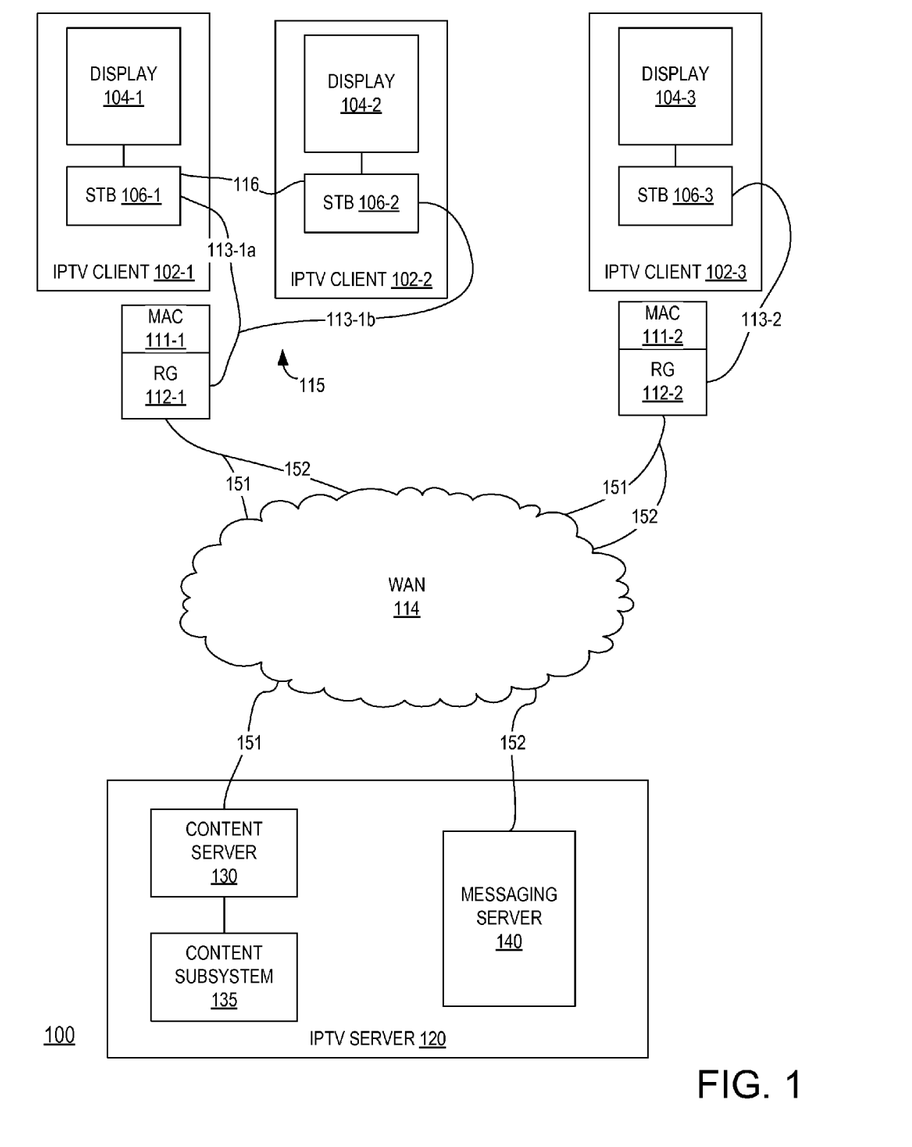
FIG. 1 is a block diagram of selected aspects of an embodiment of an Internet Protocol based television (IPTV) system.

Referring now to the drawings, FIG. 1 illustrates selected aspects of an embodiment of an IPTV system 100 operated as part of a service provider network. Throughout this disclosure, a hyphenated form of a reference numeral refers to a specific instance of an element and the un-hyphenated form of the reference numeral refers to the element generically or collectively. Thus, for example, reference numeral 102-1 refers to an instance of an element 102. As shown in FIG. 1, IPTV system 100 includes one or more IPTV clients 102 including IPTV clients 102-1 through 102-3, one or more residential gateways 112 (RGs) including RGs 112-1 and 112-2, and an IPTV server 120. In the depicted embodiment, IPTV clients 102 communicate with IPTV server 120 via RGs 112 over a wide area network (WAN) 114. WAN 114 represents various well-known network devices and media operable to enable networked communication between remotely located devices. WAN 114 may encompass, in some embodiments, the Internet and one or more local area networks (LANs).

Information that is transmitted over WAN 114 may comply with one or more standardized network communication protocols including Transmission Control Protocol (TCP) based web communication protocols including, as an example, Hypertext Transfer Protocol (HTTP), as well as various User Datagram Protocol (UDP) based streaming multimedia content protocols including, as an example, Real-time Transport Protocol (RTP). Thus, WAN 114 as shown in FIG. 1, supports streaming multimedia communication, including, for example, RTP/UDP compliant communication represented by streaming multimedia connection 151, as well as web protocol communications including, for example, HTTP compliant communications represented by web protocol connection 152. Although connections 151 and 152 are distinguished in FIG. 1, those of ordinary skill in the field of network communication will appreciate that the various protocols may be supported on a common physical medium. The physical medium for WAN 114 may include, for example, twisted wire pair, optical fibers, wireless transmission, coaxial cables, and the like.

IPTV server 120, as shown, includes a content server 130, a content subsystem 135, and a messaging server 140. Content server 130 as shown communicates over WAN 114 with a streaming multimedia connection 151. As indicated above, streaming multimedia connection 151 may comply with any one or more of various streaming multimedia content protocols including RTP, RTP Control Protocol (RTCP), and the like. Although FIG. 1 illustrates streaming multimedia connection 151 as the only connection between content server 130 and WAN 114, this illustration is intended to emphasize the significance of streaming multimedia with respect to content server 130 and it will be appreciated that content server 130 may support other types of connections including connections based on web communication protocols such as HTTP and the like.

Content subsystem 135 represents a variety of systems to acquire multimedia content, reformat it when necessary, and prepare it for transmission over WAN 114. Content subsystem 135 may include, for example, systems for capturing analog and/or digital content feeds, either directly from a content provider or from a content aggregation facility. These contents feeds may be transmitted via VHF/UHF broadcast signals, satellite signals, high-speed fiber links, or other suitable transmission means. In addition, the content feeds may include broadcasted multimedia content, for example premium audio/video programming (i.e., traditional "cable channels") widely available but not typically broadcast over airwaves. Content subsystem 130 may further include signal conditioning systems and content preparation systems for encoding content. Content subsystem 130 may further include video on demand (VoD) servers and digital rights management (DRM) servers for encrypting content.

Messaging server 140 of IPTV server 120 may include various subsystems that are not directly related to providing multimedia content. Messaging server 140 as shown communicates with WAN 114 primarily via a web communication connection 152, although messaging server 140 may support other communication protocols. Messaging server 140 may include notification servers, billing servers, and any of a variety of subscriber application servers employed by an owner or operator (i.e. network service provider) of IPTV server 120.

In the depicted embodiments, IPTV clients 102 as shown include a set-top box (STB) 106 connected to a display 104. An RG 112 connected to STB 106 via connection 113 enables IPTV client 102 to communicate over WAN 114 to the service provider network including IPTV server 120. RG 112 may include various types of commercially distributed and pervasive network appliances. RG 112 may include, as an example, a digital subscriber line (DSL) modem connected to or integrated with an IEEE 802.3 (Ethernet) and possibly an 802.11 (wireless) access point. In this embodiment, the physical medium that carries connections 151 and 152 between RG 112 and WAN 114 may include conventional 2-wire or 4-wire twisted pair telephone cables while the connections 113 between RG 112 and STB 106 may include Ethernet cables or wireless Ethernet links. In other embodiments, connections 151 and 152 may be carried over fiber optic cables or other suitable media.

STB 106 and RG 112 are examples of network addressable appliances employed in IPTV system 100. The term "network addressable appliance," as used herein, refers to devices that incorporate a network communication protocol stack, including a network layer protocol, such as the Internet Protocol (IP) that defines network addressing and routing. In the implementation shown in FIG. 1, the network on which STB 106 is directly addressable is the local area network (LAN) 115 demarcated by connections 113. In addition to being directly addressable via LAN 115, RG 112-1 is also addressable on WAN 114.

The depicted implementation of IPTV system 100 incorporates a local connection 116 that provides communication between related IPTV client systems 102 including, for example, IPTV client systems 102 connected to a common RG 112. In FIG. 1, for example, IPTV clients 102-1 and 102-2 are related IPTV clients because they are both locally connected to RG 112-1. In some embodiments, the local interconnection 116 is a sideband interconnect with respect to LAN 115, i.e., local interconnection 116 enables or supports messaging between related IPTV clients 102 where the messages do not compete for the bandwidth of LAN 115. Local interconnection 116 may be implemented as a Home Phoneline Network Association (HPNA) compliant interconnection or a Multimedia over Coax Alliance (MoCA) compliant interconnection. In this embodiment, the physical medium for local interconnection 116 may include conventional 2-wire or 4-wire twisted pair telephone cables. It should be noted however that, in such a configuration, the use of telephone cables for local interconnection 116 should be implemented such that local interconnect 116 data traffic does not interfere with data traversing connections 151 and 152. In an IPTV client system application, an HPNA or other type of local interconnection 116 may be employed to support the transmission of media content between related IPTV clients 102.

Figure 2:
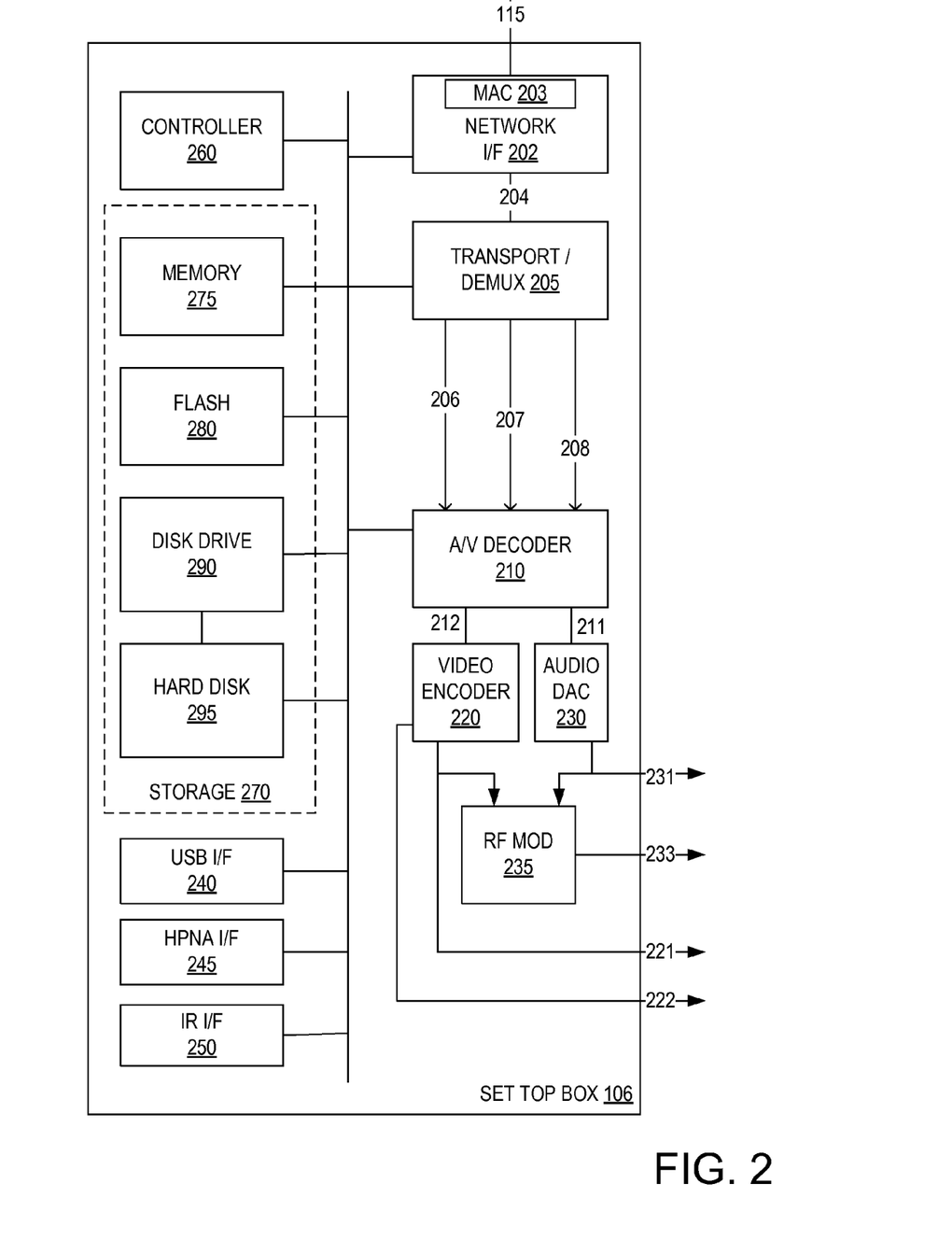
FIG. 2 is a block diagram of selected aspects of an embodied set-top box suitable for use in the IPTV system of FIG. 1.

Turning now to FIG. 2, selected components of an embodiment of the STB 106 in the IPTV client 102 of FIG. 1 are illustrated. Regardless of the specific implementation, of which STB 106 as shown in FIG. 2 is but an example, an STB 106 suitable for use in an IPTV client includes hardware and/or software functionality to receive streaming multimedia data from an IP-based network and process the data to produce video and audio signals suitable for delivery to an ATSC, NTSC, PAL, or other type of display 104 (FIG. 1). In addition, some embodiments of STB 106 may include resources to store multimedia content locally and resources to play back locally stored multimedia content.

In the embodiment depicted in FIG. 2, STB 106 includes a general-purpose processing core represented as controller 260 in communication with various special purpose multimedia modules. These modules may include a transport/demultiplexer module 205, an audio/video decoder 210, a video encoder 220, an audio digital to analog converter (DAC) 230, and a radio frequency (RF) modulator 235. Although FIG. 2 depicts each of these modules discretely, set-top box 102 may be implemented with a system on chip (SoC) device that integrates controller 260 and each of these multimedia modules. In still other embodiments, STB 106 may include an embedded processor serving as controller 260 and at least some of the multimedia modules may be implemented with a general-purpose digital signal processor (DSP) and supporting software.

Regardless of the implementation details of the multimedia processing hardware, STB 106 as shown in FIG. 2 includes a network interface 202 that enables STB 106 to communicate with an external network such as LAN 115. Network interface 202 may share many characteristics with conventional network interface cards (NICs) used in personal computer platforms. For embodiments in which LAN 115 is an Ethernet LAN, for example, network interface 202 implements level 1 (physical) and level 2 (data link) layers of a standard communication protocol stack by enabling access to the twisted pair or other form of physical network medium and supporting low level addressing using MAC addressing. In these embodiments, every network interface 202 includes a globally unique 48-bit MAC address 203 stored in a ROM or other persistent storage element of network interface 202. Similarly, at the other end of the LAN connection 113 (FIG. 1), RG 112 has a network interface (not depicted) with its own globally unique MAC address 111.

Network interface 202 may further include or support software or firmware providing one or more complete network communication protocol stacks. Where network interface 202 is tasked with receiving streaming multimedia communications, for example, network interface 202 may include a streaming video protocol stack such as an RTP/UDP stack. In these embodiments, network interface 202 is operable to receive a series of streaming multimedia packets and process them to generate a digital multimedia stream 204 that is provided to transport demux 205.

The digital multimedia stream 204 is a sequence of digital information that includes interlaced audio data streams and video data streams. The video and audio data contained in digital multimedia stream 204 may be referred to as "inband" data in reference to a particular frequency bandwidth that such data might have been transmitted in an RF transmission environment. Multimedia stream 204 may also include "out-of-band" data, which might encompass any type of data that is not audio or video data, but may refer in particular to data that is useful to the provider of an IPTV service. This out-of-band data might include, for example, billing data, decryption data, and data enabling the IPTV service provider to manage IPTV client 102 remotely.

Transport/demux 205 as shown is operable to segregate and possibly decrypt, using a decryption key, the audio, video, and out-of-band data in digital multimedia stream 204. Transport/demux 205 outputs a digital audio stream 206, a digital video stream 207, and an out-of-band digital stream 208 to A/V decoder 210. Transport/demux 205 may also, in some embodiments, support or communicate with various peripheral interfaces of STB 106 including an IR interface 250 suitable for use with an IR remote control unit (not shown) and a front panel interface (not shown).

A/V decoder 210 processes digital audio, video, and out-of-band streams 206, 207, and 208 to produce a native format digital audio stream 211 and a native format digital video stream 212. A/V decoder processing may include decompression of digital audio stream 206 and/or digital video stream 207, which are generally delivered to STB 106 as compressed data streams. In some embodiments, digital audio stream 206 and digital video stream 207 are MPEG compliant streams and, in these embodiments, A/V decoder 210 is an MPEG decoder.

The digital out-of-band stream 208 may include information about or associated with content provided through the audio and video streams. This information may include, for example, the title of a television program, start and end times for the television program, type or genre of the television program, broadcast channel number associated with the television program, and so forth. A/V decoder 210 may decode such out-of-band information. MPEG embodiments of A/V decoder 210 support a graphics plane as well as a video plane and at least some of the out-of-band information may be incorporated by A/V decoder 210 into its graphics plane and presented to the display 104, perhaps in response to a signal from a remote control device.

The native format digital audio stream 211 as shown in FIG. 2 is routed to an audio DAC 230 to produce an audio output signal 231. The native format digital video stream 212 is routed to an NTSC, PAL, ATSC or other suitable video encoder 220, which generates video outputs signals suitable for presentation to an ATSC, NTSC or PAL compliant display device 104. In the depicted embodiment, for example, video encoder 220 generates a composite video output signal 221 and an S video output signal 222. An RF modulator 235 receives the audio and composite video outputs signals 231 and 221 respectively and generates an RF output signal 233 suitable for providing to an analog input of display 104.

In addition to the multimedia modules described, STB 106 as shown includes and various peripheral interfaces. STB 106 as shown includes, for example, a USB interface 240 and a local interconnection interface 245. Local interconnection interface 245 may, in some embodiments, support the HPNA or other form of local interconnection 116 shown in FIG. 1.

The illustrated embodiment of STB 106 includes storage resources 270 that are accessible to controller 260 and possibly one or more of the multimedia modules. Storage 270 may include dynamic random access memory (DRAM) or another type of volatile storage identified as memory 275 as well as various forms of persistent or nonvolatile storage including flash memory 280 and/or other suitable types of persistent memory devices including ROMs, EPROMs, and EEPROMs. In addition, the depicted embodiment of STB 106 includes a mass storage device in the form of one or more magnetic hard disks 295 supported by an IDE compliant or other type of disk drive 290. Embodiments of STB 106 employing mass storage devices may be operable to store content locally and play back stored content when desired.

Figure 3:
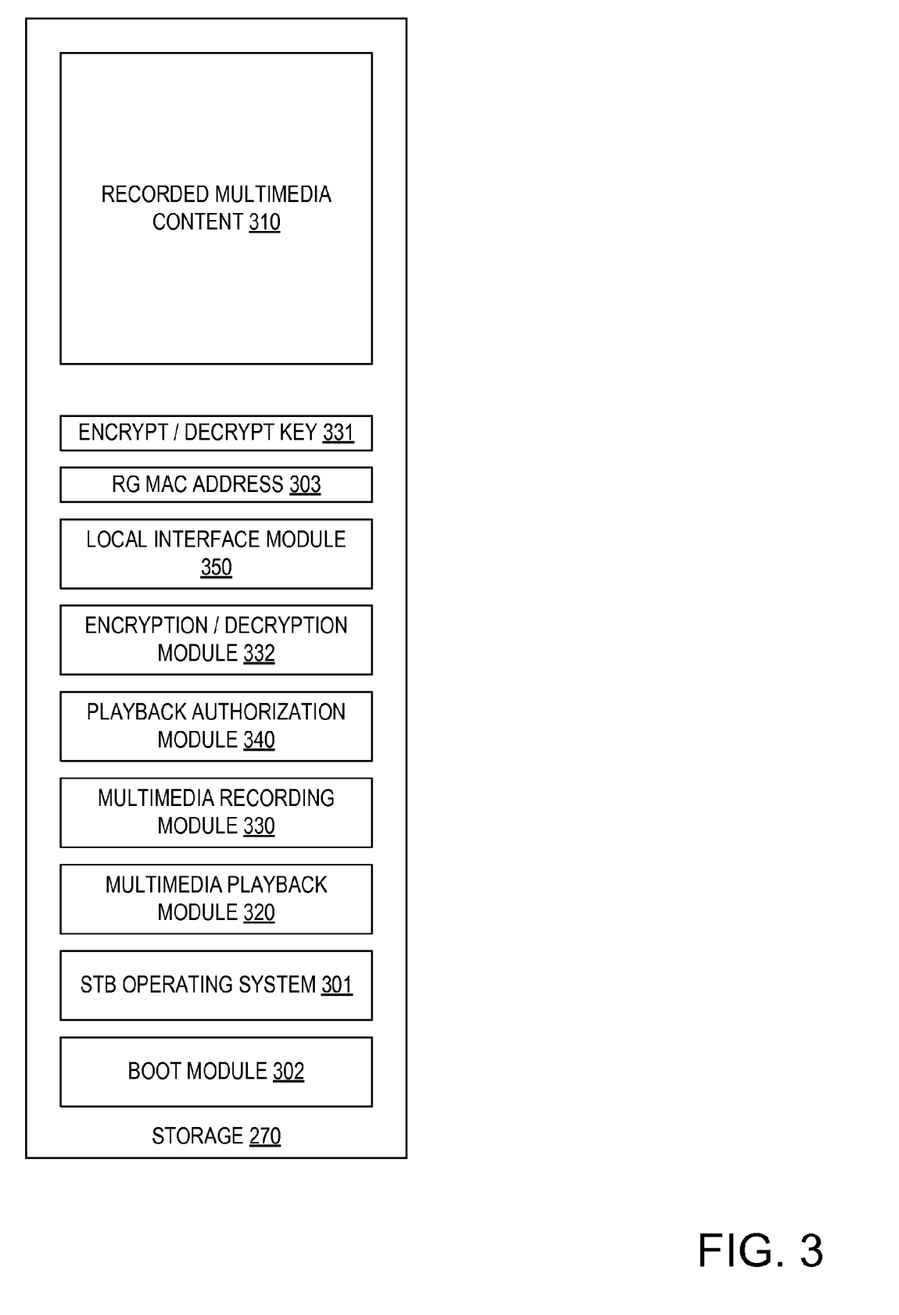
FIG. 3 is a conceptual representation of selected software modules and data structures employed in some embodiments of the set-top box of FIG. 2.

Referring now to FIG. 3, selected software components of STB 106 (FIG. 2) are illustrated conceptually as modules and/or data structures that reside in storage 270. Some aspects of the disclosed IPTV system may be implemented as software in the form of a set of processor executable or computer executable instructions stored in a computer readable medium including any of the resources within storage 270. During times when STB 106 is executing a module or accessing a data structure, all or portions of the module or data structure may reside in memory 275 (FIG. 2) while, during other times, all or portions of the storage may reside in persistent storage resources such as flash 280 (FIG. 2) and/or hard disk 295 (FIG. 2).

As depicted in FIG. 3, embodiments of STB 106 may include an STB operating system 301 that enables controller to access and execute various applications. All or portions of STB operating system 301 may be loaded into memory 275 (FIG. 2) by a boot module 302 in response to a reset event including a power off event or a soft reset. Boot module 302 may itself be stored in flash 280 (FIG. 2) or elsewhere in such a manner that boot module 302 is the first thing executed by controller 260 (FIG. 2) when STB 106 is booted. The hardware address of an assigned residential gateway, for example MAC 111-1 for RG 112-1, which is assigned by a network service provider to function with STB 106-1, may be stored in RG MAC address portion 303. Local interface module 350 is operable to coordinate communication over HPNA interface 245.

As suggested previously, STB box 106 may be operable as a multimedia recorder that can store multimedia content locally and play back stored content upon request. The embodiment of STB 106 as shown in FIG. 3 includes software modules to support multimedia recording functionality and mass storage resources necessary to store multimedia content locally. This functionality is reflected in the modules and data structures illustrated in FIG. 3 as residing in storage 270.

Storage 270 as shown in FIG. 3 includes a multimedia recording module 330, a multimedia playback module 320, and recorded multimedia content 310. Storage 270 as shown further includes one or more modules that support the multimedia record and playback functionality. For example, storage 270 may include an encryption/decryption module 332 and multimedia recording module 330 may decrypt or encrypt multimedia content that is stored locally. Such local encryption may be a different encryption than the encryption that might be applied to multimedia content as is transmitted over WAN 114. The optional encryption applied by multimedia recording module 330 is intended to prevent unauthorized copying and distribution of multimedia content that is locally stored. An IPTV service provider may authorize a subscriber to use the multimedia recording features of STB 106 by installing an encryption/decryption key 331 in storage 270.

In some embodiments, multimedia recording module 330 taps into digital media stream 204 (FIG. 2) as it is transmitted from network interface 202 (FIG. 2) to transport/demux 205 (FIG. 2) and stores the stream in storage 270 as recorded multimedia content 310. These embodiments beneficially capture multimedia content before it is decompressed by A/V decoder 210 thereby conserving mass storage resources. In these embodiments, multimedia playback module 320 is generally operable to retrieve recorded multimedia content 310, locally decrypt it if necessary, serialize the content, and transmit it sequentially to transport/demux 205, where it is processed in the same manner as multimedia content received via LAN 115.

Conventional digital video recording systems and services generally require a fully functional connection between the user (e.g. subscriber) and the service provider network to invoke playback of stored content. In contrast, embodiments of STB 106 and IPTV system 100 as disclosed herein enable STB with multimedia playback functionality that is operable in the absence of a functional connection between RG 112 and IPTV server 120. Storage 270 as shown in FIG. 3, for example, includes a playback authorization module 340 that operates independently or in conjunction with boot module 302 to support and enable multimedia playback functionality when the WAN connection is down.

Playback authorization module 340 supports digital rights management (DRM) by conditioning playback functionality on the ability to verify that STB 106 has not been physically transported to a different location. To achieve this authorization, some embodiments of boot module 302 and/or playback authorization module 340 use a globally unique identifier of RG 112 such as its MAC address 111 (FIG. 1). In these embodiments, authorization to invoke playback functionality may depend upon the ability to determine that STB 106 is connected to the one and only RG 112 associated with STB 106. Accordingly, embodied set-top boxes verify proper connectivity to an assigned RG, and provide limited functionality during any loss of connection to the service provider network.

Therefore, multimedia playback functionality may be operable despite loss of a WAN connection between IPTV client 102 and IPTV server 120. In some embodiments, RG 112 may enter a sleep mode, standby mode, or other form of reduced power mode upon a connectivity event or specified event (e.g., a full or partial loss of WAN connectivity) The network interface of RG 112 may remain functional in any of these low power states and STB 106 may be operable to identify the MAC address 111 of RG 112 (FIG. 1) and to determine when WAN connectivity is down. For example, boot module 302 of STB 106 may include instructions to determine if RG 112 is awake by sending a wake LAN packet sequence to RG 112. If boot module 302 of STB 106 determines that RG 112 is in a sleep mode and thereby concludes that WAN connectivity is lacking, STB 106 may respond by installing operating system 301 nevertheless and loading and executing playback module 320 to enable multimedia playback functionality. In this case, STB 106 transitions to an operational state in response to determining an inactive WAN in which the delivery of stored multimedia content (i.e., playback) to a display device is enabled, but other functionality may be limited. If RG 112 is determined to have full WAN connectivity, another operational state is entered in which a broadcasted multimedia content stream received via the WAN connection is sent to a display device. Accordingly, in some embodiments, a specified event or a connectivity event prompts a determination of whether a STB or multimedia digital recorder is connected to an assigned RG, and if so, playing the stored content on a display device is permitted.

Figure 4:
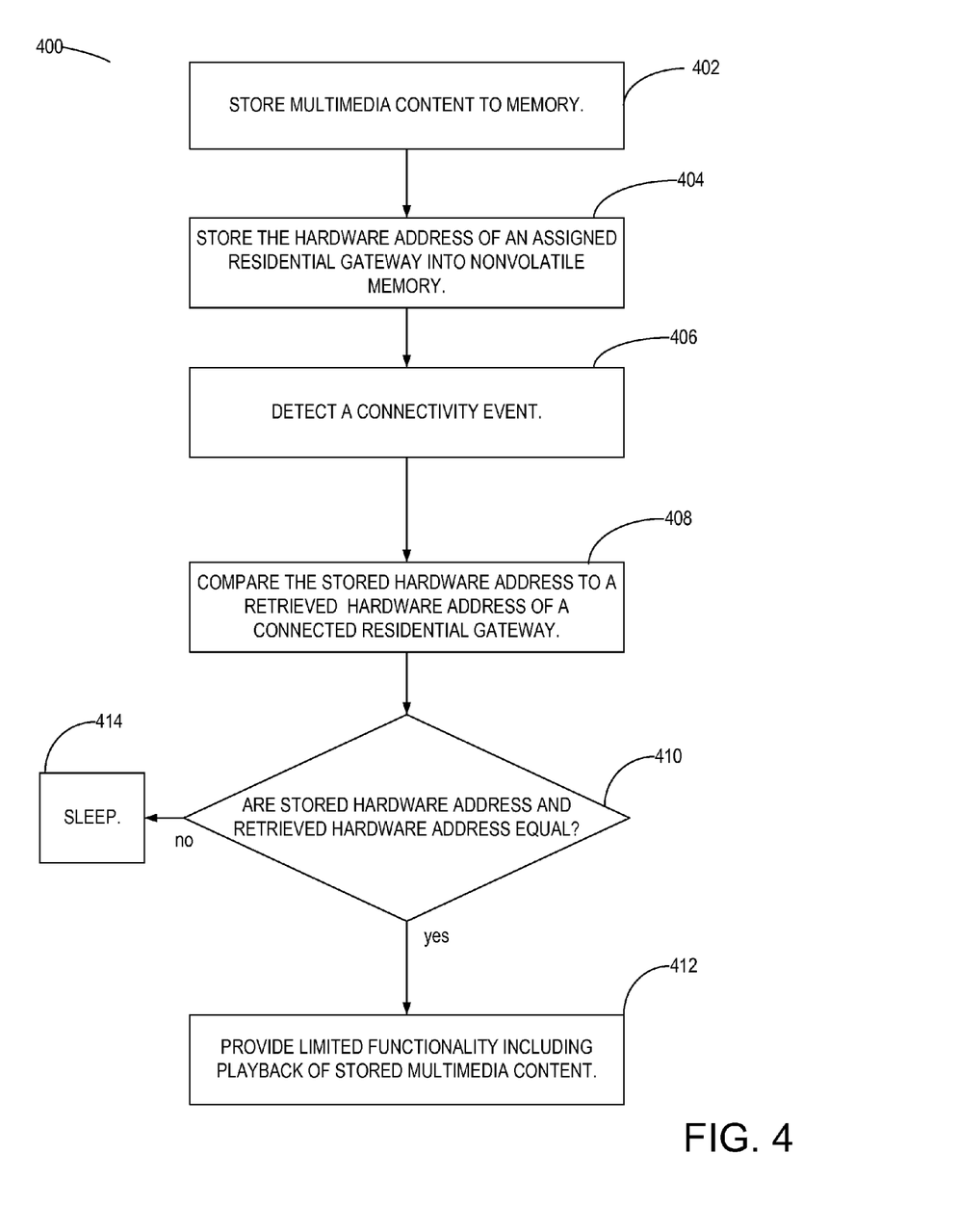
FIG. 4 is a flowchart illustrating selected aspects of an embodied method.

FIG. 4 is a flowchart illustrating aspects of method 400 for controlling access to multimedia content stored on a digital multimedia recorder, such as STB 106. In some embodiments, the digital multimedia recorder is network addressable and enabled to receive the multimedia content through an RG (e.g. RG 112-1 and 112-2) that is assigned to a user by a network provider. For example, the digital multimedia recorder may be an IPTV set-top box for receiving multimedia content including video-on-demand (VOD), local television programming, and music programming. As shown in block 402, method 400 includes storing the multimedia content to a memory (e.g. storage 270). The memory may be a disk drive, memory bank, or other form of nonvolatile memory. Method 400 includes block 404 for storing a hardware address, such as a MAC address, for the assigned RG into the nonvolatile memory. In some embodiments, block 404 involves storing a MAC address for the assigned RG to a disk drive or EEPROM on the digital multimedia recorder.

Method 400 further includes block 406 for detecting a connectivity event. An example connectivity event is a loss of full connection between the service provider network and the assigned RG. As another example, a connectivity event may involve the digital multimedia recorder booting up and establishing that the connection between the service provider network and the RG is faulty. Some traditional digital multimedia recorders, upon such connectivity events, go into standby mode or otherwise prevent access to any stored multimedia content on the digital multimedia recorder. In contrast to such systems, method 400 provides a means of accessing the stored multimedia content in the event of connectivity events. Accordingly, as shown in block 408, method 400 provides that upon the detection of the connectivity event, the digital multimedia recorder retrieves a second hardware address from a connected RG and compares it to the stored first hardware address of the assigned RG. This may happen upon the digital multimedia recorder booting-up, which may involve the digital multimedia recorder obtaining an IP address from the connected RG. Therefore, the method involves verifying after a connectivity event that the digital multimedia recorder is connected to an assigned RG, which is approved by the network service provider for allowing playback of recorded multimedia content. In some embodiments, if the digital multimedia recorder does not find a connected RG after a connectivity event, the digital multimedia recorder shuts down or enters sleep mode.

As shown in FIG. 4, method 400 includes block 410 for comparing the stored first hardware address to the retrieved second hardware address to determine whether they correspond (for example, whether they are equal). If the two hardware addresses correspond, block 412 of method 400 provides limited functionality from the digital multimedia recorder. For example, limited functionality includes access to play the multimedia content stored in the memory of the digital multimedia recorder. In addition, the limited functionality may include rewinding, pausing, and fast-forwarding through the stored content. However, the limited functionality would not include the ability to re-record in any way the stored multi-media content. Similarly, the limited functionality would not include any ability to play or otherwise access the stored multimedia content unless the stored first hardware address corresponded to the retrieved second hardware address. In other words, for example, if an embodied digital multimedia recorder were taken to a friend's house and accessed through an unassigned RG, then any access to the stored multimedia content would be denied. Accordingly, if the stored hardware address and retrieved hardware address are not equal, as shown in block 414, the digital multimedia recorder enters sleep mode.

Providing limited functionality from the digital multimedia recorder after a connectivity event allows a user to view multimedia content when it would otherwise be unavailable. After the connectivity event, comparing the hardware address (e.g. MAC address) of a connected RG to the hardware address (e.g. MAC address) of the assigned RG ensures that the user will not violate copyright restrictions or other rules, such as by displaying the multimedia content while connected to an unapproved RG. Although not illustrated in FIG. 4, method 400 may include additional aspects, such as retrieving a decryption key for decrypting the multimedia content.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A multimedia access method, comprising:
   recording broadcasted content received by a residential gateway coupled to a network appliance;
   responsive to detecting, by the network appliance, a connectivity event associated with the residential gateway, accessing a first hardware address corresponding to the residential gateway and accessing a second hardware address corresponding to the residential gateway, wherein the connectivity event comprises a loss of wide area network connectivity between the residential gateway and a broadcast signal provider;
   responsive to detecting the first hardware address matching the second hardware address, playing back broadcasted content recorded by the residential gateway; and
   responsive to detecting a mismatch between the first hardware address and the second hardware address, preventing access to the broadcasted content recorded by the residential gateway.

2. The method of claim 1, wherein the residential gateway is coupled between the network appliance and a co-axial cable wide area network.

3. The method of claim 1, wherein the network appliance comprises a set top box.

4. A non-transitory computer readable medium including processor-executable program instructions that, when executed by a processor, cause the processor to perform operations comprising:
   recording broadcasted content received by a residential gateway;
   responsive to detecting a connectivity event associated with between the residential gateway, accessing a first hardware address corresponding to the residential gateway and accessing a second hardware address corresponding to the residential gateway, wherein the connectivity event comprises a loss of wide area network connectivity between the residential gateway and a broadcast signal provider; and
   responsive to detecting the first hardware address matching the second hardware address, playing back broadcasted content recorded by the residential gateway; and
   responsive to detecting a mismatch between the first hardware address and the second hardware address, preventing access to the broadcasted content recorded by the residential gateway.

5. The non-transitory computer readable medium of claim 4, wherein the first hardware address comprises a MAC address.

6. The non-transitory computer readable medium of claim 4, wherein the operations include:
accessing a decryption key for decoding the broadcasted content.

7. The non-transitory computer readable medium of claim 4, wherein the operations include:
disabling a set-top box in response to the first hardware address not corresponding to the second hardware address.

8. The non-transitory computer readable medium of claim 7, wherein the operations include:
automatically rebooting the set-top box in response to the loss of connectivity.

9. The non-transitory computer readable medium of claim 7, wherein the operations include:
providing the broadcasted content to a second set-top box, wherein the second set-top box is in communication with the residential gateway.

10. A network appliance, comprising:
a processor; and
a computer readable medium, including processor executable program instructions that when executed by the processor, cause the processor to perform operations comprising:
recording broadcasted content received by a residential gateway coupled to the network appliance;
responsive to detecting, by the network appliance, a connectivity event associated with the residential gateway, wherein the connectivity event comprises a loss of wide area network connectivity between the residential gateway and a broadcast signal provider, accessing a first hardware address corresponding to the residential gateway coupled to the network appliance, accessing a second hardware address corresponding to the residential gateway assigned to the network appliance;
responsive to detecting the first hardware address matching the second hardware address, playing back broadcasted content recorded by the residential gateway; and
responsive to detecting a mismatch, preventing access to the broadcasted content recorded by the residential gateway.

11. The network appliance of claim 10, wherein the broadcasted content is received by the residential gateway from a co-axial cable wide area network.

12. The network appliance of claim 10, wherein the network appliance comprises a set top box.

* * * * *